US 8,028,230 B2

(12) United States Patent  
Hong (10) Patent No.: US 8,028,230 B2
(45) Date of Patent: Sep. 27, 2011

(54) CONTEXTUAL INPUT METHOD

(75) Inventor: Feng Hong, Foster City, CA (US)

(73) Assignee: Google Inc., Mountain View, CA (US)

( * ) Notice: Subject to any disclaimer, the term of this patent is extended or adjusted under 35 U.S.C. 154(b) by 1190 days.

(21) Appl. No.: 11/673,706

(22) Filed: Feb. 12, 2007

(65) Prior Publication Data

US 2008/0193015 A1   Aug. 14, 2008

(51) Int. Cl.
*G06K 9/00*   (2006.01)
(52) U.S. Cl. ......... 715/264; 715/257; 382/185; 382/187
(58) Field of Classification Search .................. 715/257, 715/264; 382/185, 187
See application file for complete search history.

(56) References Cited

U.S. PATENT DOCUMENTS

| | | | | |
|---|---|---|---|---|
| 5,299,124 | A * | 3/1994 | Fukumochi et al. | 704/2 |
| 6,111,985 | A * | 8/2000 | Hullender et al. | 382/229 |
| 6,134,528 | A * | 10/2000 | Miller et al. | 704/258 |
| 6,173,253 | B1 | 1/2001 | Abe et al. | |
| 6,401,060 | B1 * | 6/2002 | Critchlow et al. | 704/1 |
| 6,418,239 | B1 * | 7/2002 | Hullender et al. | 382/229 |
| 6,621,424 | B1 * | 9/2003 | Brand | 341/22 |
| 6,646,572 | B1 * | 11/2003 | Brand | 341/22 |
| 6,694,055 | B2 * | 2/2004 | Wu | 382/185 |
| 6,983,248 | B1 * | 1/2006 | Tahara et al. | 704/255 |
| 7,013,258 | B1 * | 3/2006 | Su et al. | 704/1 |
| 7,664,748 | B2 * | 2/2010 | Harrity | 707/809 |
| 2002/0062214 | A1 * | 5/2002 | Hanson | 704/260 |
| 2002/0168107 | A1 * | 11/2002 | Tang et al. | 382/187 |
| 2003/0212563 | A1 * | 11/2003 | Ju et al. | 704/277 |
| 2005/0169527 | A1 * | 8/2005 | Longe et al. | 382/177 |
| 2005/0190973 | A1 * | 9/2005 | Kristensson et al. | 382/229 |
| 2005/0209844 | A1 * | 9/2005 | Wu et al. | 704/2 |
| 2005/0270270 | A1 * | 12/2005 | Chadha | 345/157 |
| 2006/0010109 | A1 * | 1/2006 | Harrity | 707/3 |
| 2006/0206307 | A1 * | 9/2006 | Sugihara et al. | 704/4 |
| 2008/0154576 | A1 * | 6/2008 | Wu et al. | 704/2 |

FOREIGN PATENT DOCUMENTS

| | | |
|---|---|---|
| CN | 1232226 A | 10/1999 |
| WO | 98/55957 | 12/1998 |
| WO | 2006/060263 A2 | 6/2006 |

OTHER PUBLICATIONS

Notification of Transmittal of the International Search Report and the Written Opinion of the International Searching Authority, or the Declaration (Apr. 2, 2009).
First Office Action for Chinese Patent Appl. No. 200710101820.X, dated Apr. 20, 2011, 8 pages and English Translation 9 pages.

* cited by examiner

*Primary Examiner* — Stephen Hong
*Assistant Examiner* — Marshon Robinson
(74) *Attorney, Agent, or Firm* — Fish & Richardson P.C.

(57) ABSTRACT

A input method selects a character from a plurality of characters of a logographic script, and identifies characters proximate the selected character. One or more candidate characters are then selected based on a composition input and the proximate characters.

19 Claims, 5 Drawing Sheets

CONTEXTUAL INPUT METHOD

BACKGROUND

This disclosure relates to input methods.

Languages that use a logographic script in which one or two characters, e.g., glyphs, correspond roughly to one word or meaning have more characters than keys on a standard input device, such as a computer keyboard on a mobile device keypad. For example, the Chinese language contains thousands of characters defined by base Pinyin characters and five tones. The mapping of these many-to-one associations can be implemented by input methods that facilitate entry of characters and symbols not found on input devices. Accordingly, a Western-style keyboard can be used to input Chinese, Japanese, or Korean characters.

Conventional input methods can utilize a session-based context to make input predictions based on composition inputs. At each input, the session-based context is reset.

SUMMARY

In an implementation, an input method selects a character from a plurality of characters of a logographic script, and identifies proximate characters adjacent the selected character. One or more candidate characters are then selected based on a composition input and the proximate characters.

In another implementation, a system includes a data store and an input engine. The data store can store an association of composition inputs and characters, wherein one or more of the characters are associated with a plurality of composition inputs. The input engine can cause a processing device to select a character from a plurality of characters in response to a user input, identify adjacent characters adjacent the selected character, and identify one or more candidate characters based on a composition input and the adjacent characters.

In another implementation, an input method positions a cursor adjacent one or more characters. Characters adjacent the cursor are identified, and a composition input is received. One or more candidate characters are then selected based on a composition input and the adjacent characters.

The systems and methods disclosed herein can, for example, facilitate identification an input context based on a cursor position. In one example implementation, the input context can result in fewer and/or more accurate identifications of candidate characters for selection. In another example implementation, the input context based on the cursor position provides an initial context independent of a composition input, and modifies the context based on the composition inputs received. Such example advantages need not be realized, however, or may be separately realized.

DETAILED DESCRIPTION

Figure 1:
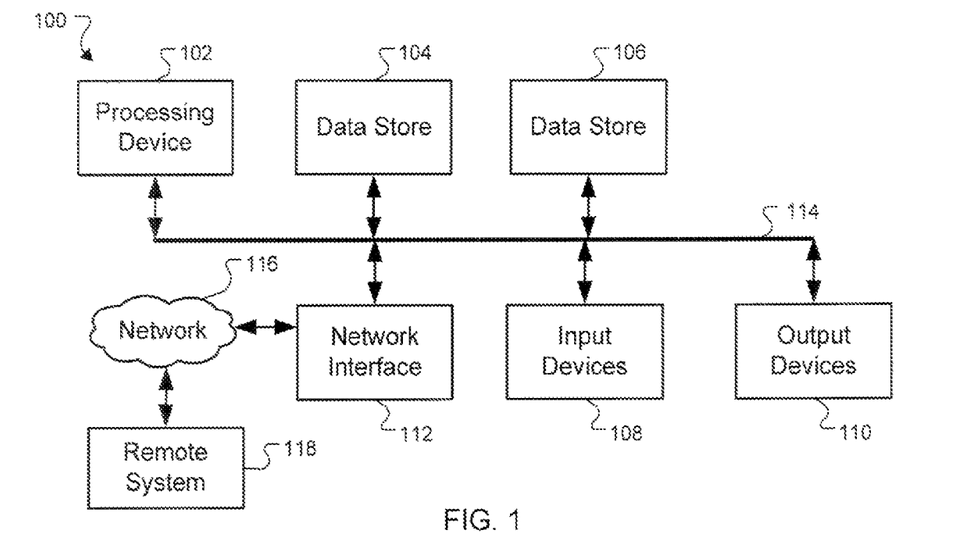
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as a personal computer device, or other electronic devices, such as a mobile phone, mobile communication device, personal digital assistant (PDA), and the like.

The example system 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In one implementation, the system 100 can receive composition inputs for input characters or symbols, such as, for example, Hanzi characters. For example, the user can use one or more of the input devices 108 (e.g., a keyboard, such as a Western-style keyboard, a stylus with handwriting recognition engines, etc.) to input composition inputs for identification of Hanzi characters. In some examples, a Hanzi character can be composed of more than one composition input. Various input methods engines (IMEs) are available for converting composition inputs into Hanzi characters. Each of the IMEs can have, for example, different composition inputs representing a same Hanzi character, depending on the implementation of the IME. For example, the same Hanzi character can be associated with different composition inputs in a Pinyin IME.

In one implementation, the system 100 can receive one or more Pinyin composition inputs and convert the composition inputs into Hanzi characters. The Pinyin IME can, for example, use compositions of Pinyin syllables or characters received from keystrokes to represent the Hanzi characters. Each Pinyin syllable can, for example, correspond to a key in the western keyboard. Using the Pinyin IME, a user can input a Hanzi character by using composition inputs that includes one or more Pinyin syllables representing the sound of the Hanzi character.

The first data store 104 and/or the second data store 106 can store an association of composition inputs and characters. Based on a user input, the processing device 102 can use information in the data store 104 and/or the data store 106 to identify one or more candidate characters represented by the input. In one implementation, if more than one candidate character is identified, the candidate characters are displayed on an output device 110. Using the input device 108, the user can select from the candidate characters a Hanzi character that the user desires to input.

In one implementation, the processing device 102 can identify the candidate characters based on one or more composition inputs and proximate characters in the text. In one implementation, the proximate characters are adjacent characters; other proximate characters, however, can also be used. The adjacent characters can, for example, provide contextual information that can be utilized to identify a candidate character. For example, a user can select a character from a plurality of characters of a logographic script, such as a character in a sentence or paragraph of Hanzi characters. Based on the selection, the processing device 102 can identify one or more characters adjacent to the selected character and receive a composition input from the user. Based on the composition input and the adjacent characters, the processing device 102 can identify one or more candidate characters for selection by the user.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive a composition input from a user over the network interface 112. The processing device 102 can, for example, identify one or more characters adjacent to the selected character, and identify one or more candidate characters based on the received composition input and the adjacent characters. The system 100 can transmit a data communication that includes the candidate characters back to the remote computing system.

Figure 2:
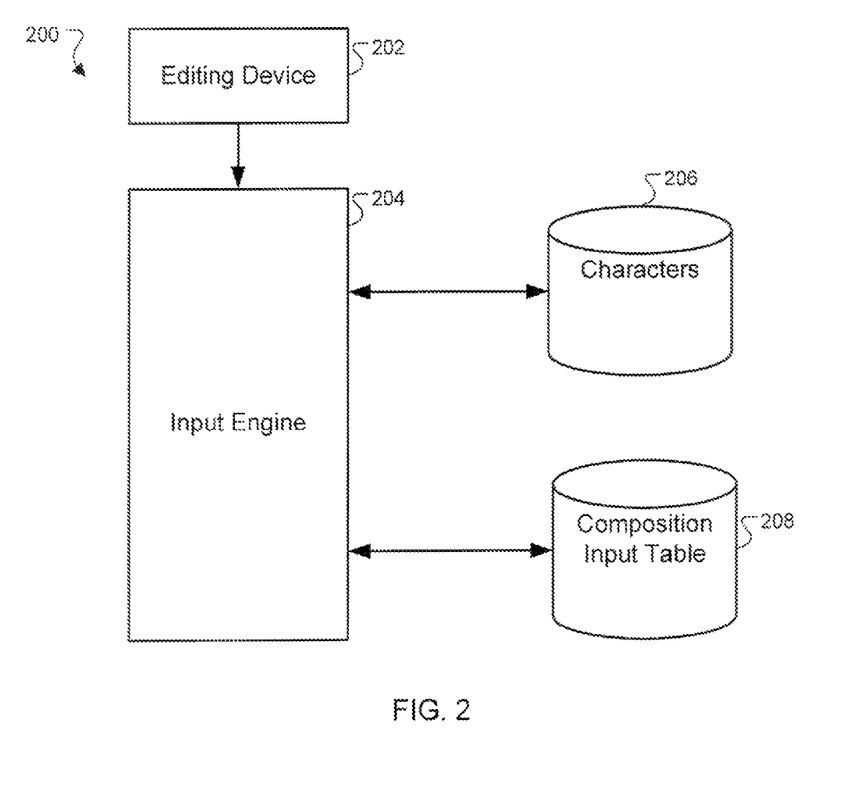
FIG. 2 is a block diagram of an example editing system.

FIG. 2 is a block diagram of an editing system 200 that can be implemented in the system 100. The editing system 200 includes an editing device 202, an input engine 204, a characters data store 206, and a composition input data store 208. In one implementation, the data stores 206 and 208 can be implemented in one or more databases or respective tables in a database as a single data store. Other implementations can also be used.

The editing device 202 and the input engine 204 can, for example, be defined by instructions executable by the processing device 102. For example, the system 100 can be used to implement the editing system 200 by executing the instructions included in the editing device 202 and the input engine 204.

In one implementation, a user can use the editing device 202 to edit a text containing logographic script. In one implementation, the editing device 202 can be word processing software that receives user input and displays text to be edited, and the input engine 204 can be a context based input engine. The editing device 202 and the input engine 204 can be stored in a computer readable medium, such as in the data store 104 and/or the data store 106.

The character data store 206 and the composition input data store 208, can, for example, also be stored in the data store 104 and/or the data store 106. The character data store 206 includes characters of a logographic script used in the editing device 202. In some implementations, the character data store 206 also includes information about relationships between characters. For example, the character data store 206 can include scores or probability values assigned to a character depending on characters adjacent to the character. Other contextual relation data can also be used.

The composition input data store 208 includes an association of composition inputs and the characters stored in the character data store 206. In some implementations, the composition input data store 208 can link each of the characters in the character data store 206 to a composition input used by the input engine 204. For example, the input engine 204 can utilize the information in the character data store 206 and the composition input data store 208 to associate and/or identify one or more characters in the character data store 206 with one or more composition inputs in the composition input data store 208. Other associations can also be used.

In an implementation, the input engine 204 can identify candidate characters based on a composition input and characters adjacent a selected character or adjacent a cursor position. The editing device 202 can receive a selection of a character in the logographic script, such as, for example, a selection of a character to be changed or modified. In one implementation, a user can select to change a Hanzi character in a plurality of Hanzi characters in the editing device 202 and provide one or more composition inputs to the editing device 202. Selection information, such as the selected character, can be provided to the input engine 204.

Based on the selection information received from the editing device 202, the input engine 204 can, for example, identify characters adjacent the selected character in the editing environment 202. Based on the adjacent characters and one or more composition inputs, the input engine 204 can access the data stores 206 and 208 to identify candidate characters to be inserted at the location of the selected characters, or to replace the selected character.

In some implementations, the input engine 204 can define a context window in the edited text. The context window can, for example, be utilized to identify adjacent characters. For example, the context window can be defined to include the selected character and one or more adjacent characters adjacent the selected character. In one example, the input engine 204 can center the context window on the selected character and/or cursor position and identify other characters in the context window as the adjacent characters. For example, the input engine 204 can specify a size of the context window to be five characters, and identify the adjacent characters as the two characters to the right of the selected character and the two characters to the left of the selected character. Other context window sizes and definitions can also be used.

The input engine 204 can, for example, dynamically adjust a location and/or a size of the context window. In some implementations, the input engine 204 can dynamically adjust the location of the context window by identifying a sentence break within the context window. For example, input engine 204 can identify a sentence break within the current context window. Based on the identified location of the sentence break in the context window, the input engine 204 can adjust one or both edges of the context window to coincide with the sentence break. Other adjustment techniques can also be used.

The system 200 can, for example, also dynamically adjust the width of the context window based on the number of candidate characters identified. For example, the input engine 204 can specify a minimum number of candidate characters and a maximum number of candidate characters. In some implementations, the input engine 204 is configured to limit a number of identified candidate characters to be greater than the minimum number of candidate characters and less than the maximum number of candidate characters. If the number of candidate characters exceeds the maximum number of candidate characters, then the input engine 204 can, for example, increase the width of the context window. Similarly, if the number of candidate characters is less than the minimum number of candidate characters, then the input engine 204 can, for example, decrease the width of the context window.

In other implementations, the number of candidate characters can be selected independent of a context window. For example, the input engine 204 can identify additional adjacent characters if the number of candidate characters is greater than the maximum number of candidate characters, and can identify fewer adjacent characters if the number of candidate characters is less than the minimum number of candidate characters.

In some implementations, the input engine 204 can, for example, identify candidate characters based on the composition input and a current input session. For example, the input session can include some or all previously input characters subject to an acceptance command. The input engine 204 can identify another set of candidate characters based on the current composition input and/or one or more previously identified candidate characters in the current input session.

In some implementations, the input engine 204 can compare two sets of candidate characters. A first set of candidate characters can, for example, be generated based on the current input session and the composition input. A second set can be generated based on the adjacent characters and the composition input. In one implementation, the input engine 204 identifies common candidate characters from the sets of candidate characters. The common candidate characters can, for example, be presented in the editing device 202 for user selection. In another implementation, the input engine 204 can rank the candidate characters and present the candidate characters for user selection based on the rank. For example, the input engine 204 can rank the candidate characters based on a probability or accuracy value assigned to each of the candidate characters. Other ranking and comparison techniques can also be used.

In another implementation, the input engine 204 can retain context information after each input session as historical information. Such historical information may be retained in one or both of the data stores 206 and 208, or in a separate historical data store. The historical information can be accessed by the input engine 204 to facilities the selection of candidate characters based, in part, on a particular user's typing history.

Figure 3:
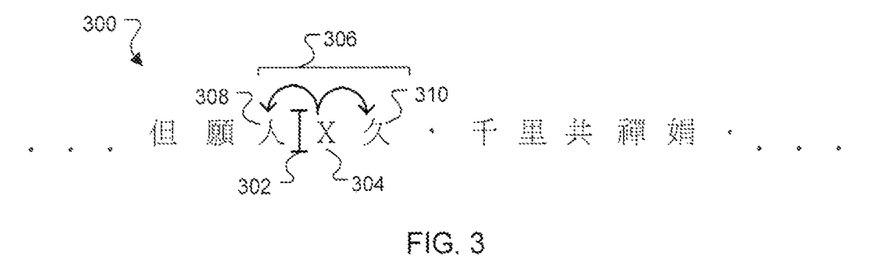
FIGS. 3-6 are schematic diagrams showing examples of editing a logographic script.

FIGS. 3-6 are schematic diagrams showing examples of editing a selected character in a logographic script 300. The editing system 200 can edit one or more characters in the logographic script 300. As shown in FIG. 3, a cursor 302 can select a character 304 in the logographic script 300. In the depicted example, a context window 306 is defined to be centered on the selected character 304. In some implementations, the processing device 102 can identify characters 308 and 310 as adjacent characters. Based on the adjacent characters 308 and 310 and a composition input, the processing device 102 and/or input engine 204 can identify candidate characters for the selected character 304.

Figure 4:
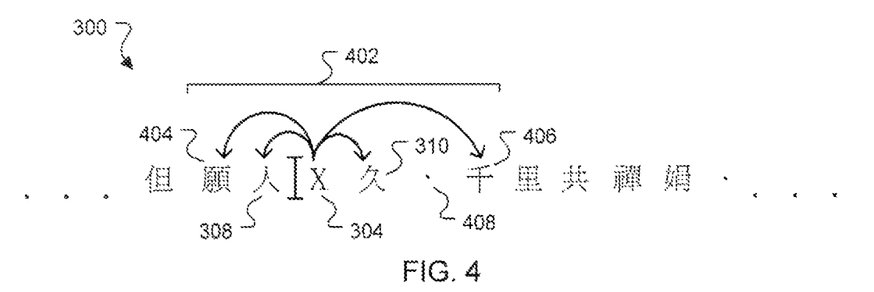

As shown in FIG. 4, an adjusted context window 402 can be used to identify adjacent characters In this example, the context window 402 is larger than the context window 306. In some implementations, the processing device 102 and/or input engine 204 can determine whether the number of candidate characters resulting from the context window 306 is greater than a maximum number of candidate characters. If the number of candidate characters resulting from a context window 306 is greater than the maximum number of candidate characters, the processing device 102 and/or input engine 204 can dynamically adjust a size of the context window 306, resulting in the context window 402. Based on the context window 402, the processing device 102 and/or input engine 204 can, for example, identify additional adjacent characters 404 and 406. Using the adjacent characters 308, 310, 404 and 406, the processing device 102 and/or input engine 204 can identify a new set of candidate characters and/or additional candidate characters. In some implementations, a larger context window can reduce the number of candidate characters.

Figure 5:
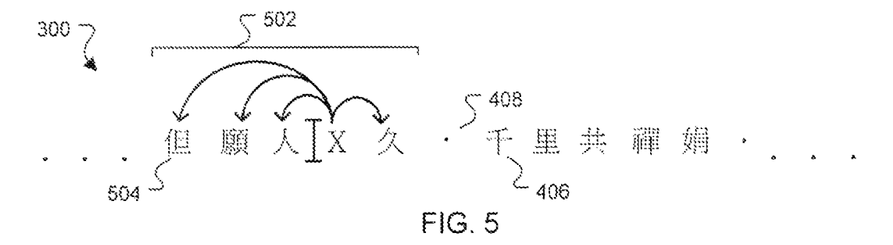

The processing device 102 and/or input engine 204 can, in one implementation, determine whether there is a sentence break within the context window 402. In this example, a sentence break 408 (e.g., a comma character) is included in the context window 402. The processing device 102 and/or input engine 204 can then adjust an edge of the context window 402 to coincide with the sentence break 408. An example adjusted context window 502 is shown in FIG. 5. The edges of the context window 502 are adjusted to coincide with the sentence break 408. Thus, the character 406 is removed from the adjacent characters and a character 504 is added as one of the adjacent characters. Other types of sentence breaks can also be used to adjust the context window, e.g., periods, colons, clauses, etc.

Figure 6:
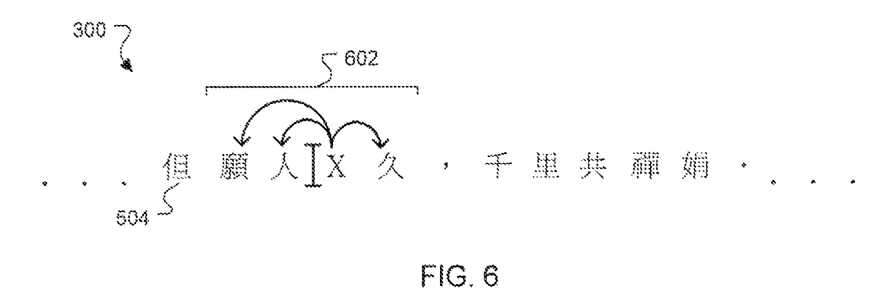

In some implementations, the processing device 102 and/or input engine 204 can further adjust the size of the context window based on the resulting number of candidate characters. For example, the processing device 102 and/or input engine 204 can determine whether the number of candidate characters resulting from the context window 502 is less than a minimum number of candidate characters. If the number of candidate characters resulting form the context window 502 is less than the minimum number of candidate characters, the processing device 102 and/or input engine 204 can reduce the size of the context window 502. As shown in FIG. 6, the processing device 102 and/or input engine 204 generates a context window 602 with a size of four characters, and which is between the sizes of the context window 306 (three characters) and the context window 502 (five characters).

Figure 7:
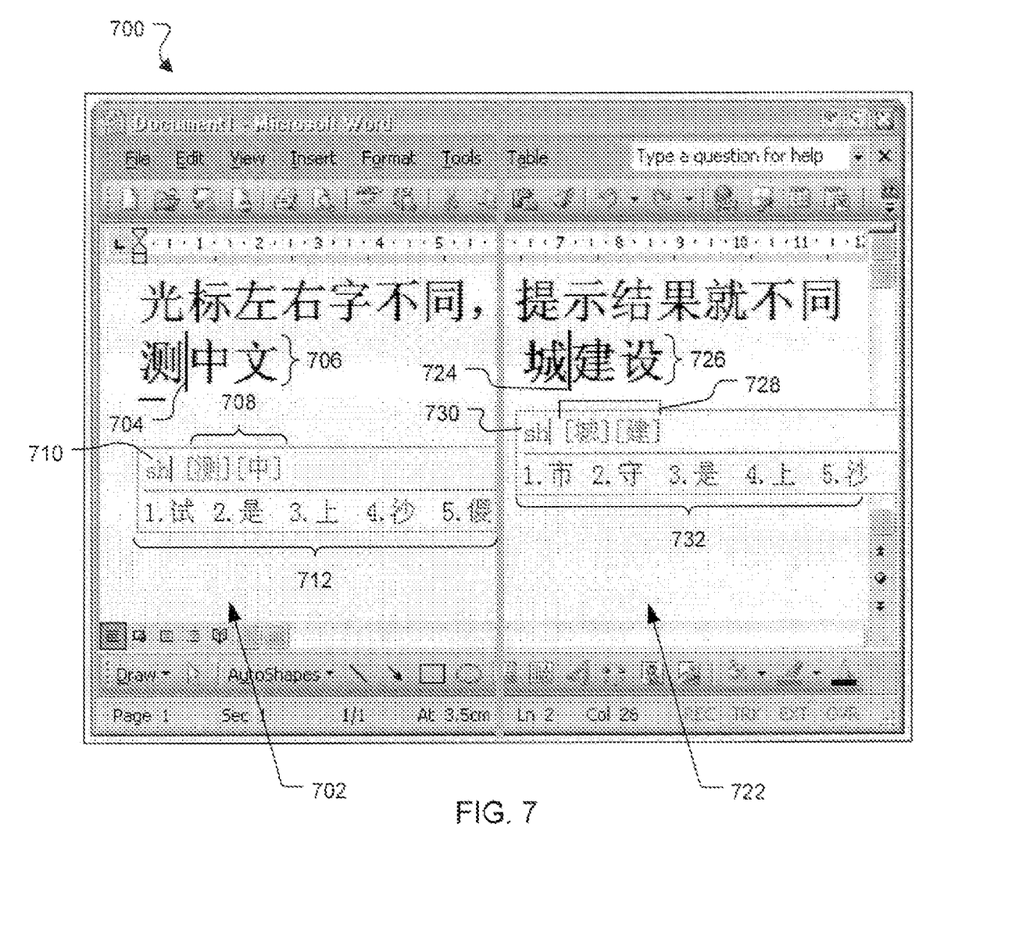
FIG. 7 depicts display examples in a logographic editing environment.

In some implementations, the logographic editing system 200 can also identify candidate characters based on a position of a cursor in the editing device 202. FIG. 7 depicts a display examples 702 and 722 in a logographic editing environment 700.

In the first example 702, a cursor 704 is positioned between the first and second characters of the phrase 706, and adjacent characters 708 are identified. A composition input 710, e.g., "sh," is received and provided to the input engine 204. The input engine 204 identifies a list of candidate characters 712 eligible to be inserted at the locations of the cursor 704. For example, the two adjacent characters 708, which are adjacent the cursor 704 in the phrase 706, are identified as adjacent characters for the cursor 704. Based on the composition input 710 and the two adjacent characters 708, the set of candidate characters 712 is identified. A user can select one of the candidate characters for insertion at the position of the cursor 704.

In the second example 722, a cursor 724 is positioned between first and the second characters of the phrase 726, and adjacent characters 728 are identified. A composition input 730, e.g., "sh," is received and provided to the input engine 204. The input engine 204 identifies a list of candidate characters 732 eligible to be inserted at the locations of the cursor 724. For example, the two adjacent characters 728, which are adjacent the cursor 724 in the phrase 726, are identified as adjacent characters. Based on the composition input 730 and the two adjacent characters 728, a set of candidate characters 732 is identified. A user can select one of the candidate characters for insertion at the position of the cursor 724.

As the two examples illustrate, the input engine 204 identifies different candidate character sets 712 and 732 for the same composition input "sh." The contextual information provided by the adjacent characters 708 causes the input engine 204 to identify the first candidate character set 712, and the contextual information provided by the adjacent characters 728 causes the input engine 204 to identify the second candidate character set 732.

In one implementation, the adjacent characters, e.g., characters 708, can be displayed in juxtaposition to one or more candidate characters, e.g., characters 712. This implementation thus provides a user with indicia of the context information.

In another implementation, selection of a character will cause the input engine 204 to select characters adjacent the selected character as adjacent characters. For example, in the first example 702, if the character 樂 is selected, the characters 瀾 and 文 can be identified as the adjacent characters. The input engine 204 can thus modify a selected character based on composition inputs and the identified adjacent characters.

Figure 8:
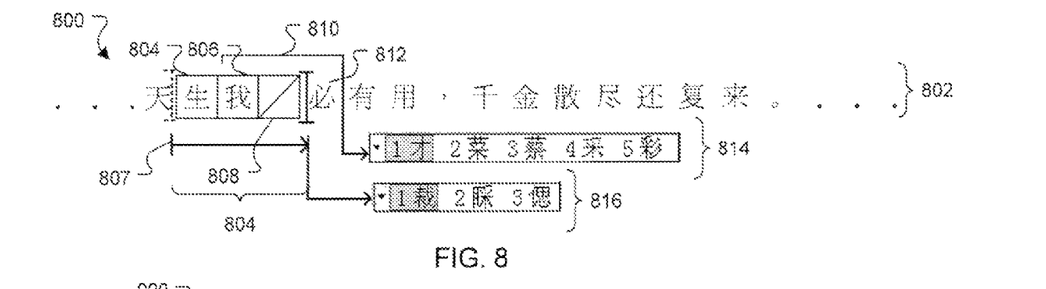
FIG. 8 is a schematic diagram of an editing environment for Hanzi characters.

FIG. 8 is a schematic diagram of an editing environment 800 for Hanzi characters 802. In an implementation, the editing system 200 can identify candidate characters based on a combined result of two sets of candidate characters. A first set of candidate characters can be based on a current input session, or based on some other section algorithm, and a second set of candidate characters can be based on adjacent characters and a composition input.

As shown in FIG. 8, the Hanzi characters 802 include two characters 804 and 806 that have been input during a current input session. The current input session is defined by the session arrow 807, which represents the characters input and/or edited from an initial placement of a cursor.

The Hanzi characters 802 also include a character 808 that is currently being edited in the input session. Based on a composition input, candidate characters can be identified for the selected character 808. The context window 810 can include the character 806, the selected character 808, and a preexisting character 812. The characters 806 and 812 are thus identified as adjacent characters of the selected character 808.

Accordingly, a first set of candidate characters 814 is identified based on the composition input and adjacent characters 806 and 812. Likewise, a second set of candidate characters 816 is identified based on the composition input and the characters 804 and 806 input during the current input session.

In some implementations, the system 200 can compare the sets 814 and 816 to identify a set of candidate characters to be presented. In one implementation, the processing device 102 and/or input engine 204 can identify the common characters in the sets 814 and 816 and present the common characters as the candidate characters. In another implementation, the processing device 102 and/or input engine 204 can rank the candidate characters in the sets 814 and 816. According to the rank, the processing device 102 and/or input engine can present a subset of the candidate characters in the sets 814 and 816; or can present a re-ordered list of consolidated candidate characters; or can present the candidate characters from the sets 814 and 816 according to other interrelations.

Figure 9:
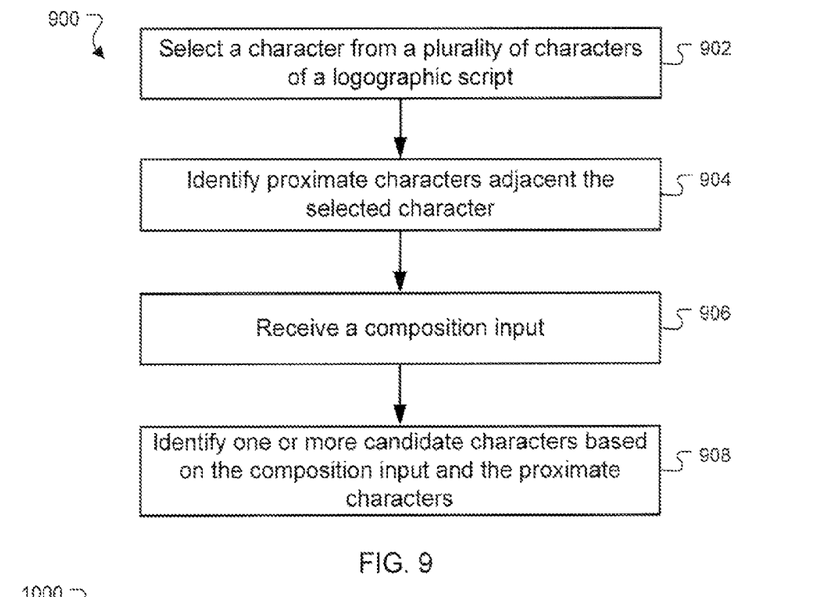
FIG. 9 is a flow diagram of an example process for identifying candidate characters for a logographic script.

FIG. 9 is a flow diagram of an example process 900 for identifying candidate characters for a logographic script. The process 900 can, for example, be implemented in a system such as the system 100 of FIG. 1 and/or the system 200 of FIG. 2.

Stage 902 selects a character from a plurality of characters of a logographic script. For example, the input device 108 can be utilized to select a character in a text of Hanzi characters (e.g., the text in the logographic script 300 in FIG. 3) in the editing device 202.

Stage 904 identifies characters proximate, e.g., adjacent, the selected characters. For example, the input engine 204 can identify adjacent characters adjacent to the selected character in the text of Hanzi characters in the editing device 202.

Stage 906 receives a composition input. For example, the input engine 204 can receive a composition input (e.g., a composition of Pinyin characters) from the input device 108.

Stage 908 identifies one or more candidate characters based on the composition input and the proximate, e.g., adjacent, characters. For example, the input engine 204 can identify one or more candidate characters based on the composition input and the adjacent characters using the character data store 206 and the composition input data store 208.

Figure 10:
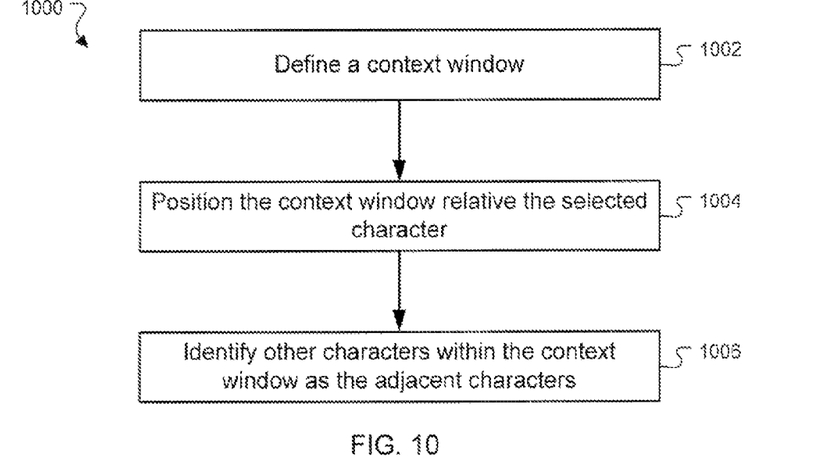
FIG. 10 is a flow diagram of an example process for identifying adjacent characters for a selected character in a logographic script.

FIG. 10 is a flow diagram of an example process 1000 for identifying adjacent characters for a selected character in a logographic script. For example, the process 1000 can be used to identify the adjacent characters 308, 310 of the selected character 304 of FIG. 3. The process 1000 can, for example, be implemented in a system such as the system 100 of FIG. 1 and/or the system 200 of FIG. 2.

Stage 1002 defines a context window. For example, the input engine 204 can define a context window.

Stage 1004 positions, e.g., centers, the context window relative to the selected character. For example, the input engine 204 can center the context window 306 at the selected character 304.

Stage 1006 identifies other characters within the context window as the adjacent characters. For example, the input engine 204 can identify the characters 308, 310 as the adjacent characters.

Figure 11:
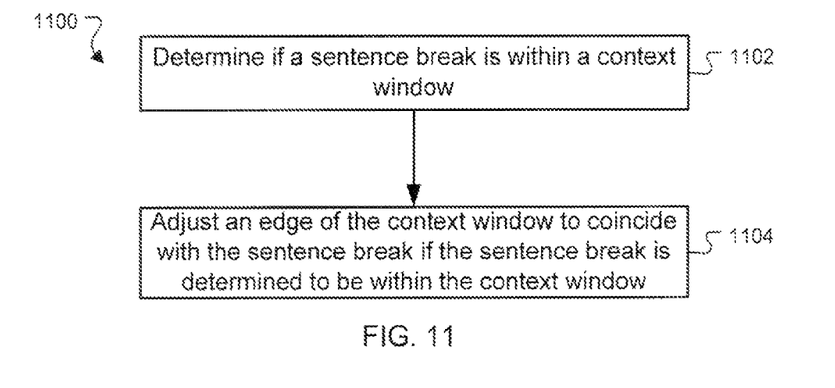
FIG. 11 is a flow diagram of an example process for adjusting an edge of a context window.

FIG. 11 is a flow diagram of an example process 1100 for adjusting an edge of a context window. For example, the input engine 204 can adjust a position of the context window to align the edge of the context window to a sentence break. The process 1100 can be, for example, be implemented in a system such as the system 100 of FIG. 1 and/or the system 200 of FIG. 2.

Stage 1102 determines if a sentence break is within a context window. For example, the input engine 204 can identify the sentence break 408 in the context window 402 in FIG. 4.

Stage 1104 adjusts an edge of the context window to coincide with the sentence break if the sentence break is determined to be within the context window. For example, the input engine 204 can adjust an edge of the context window 402 to coincide with the sentence break 408, resulting in the context window 502.

Figure 12:
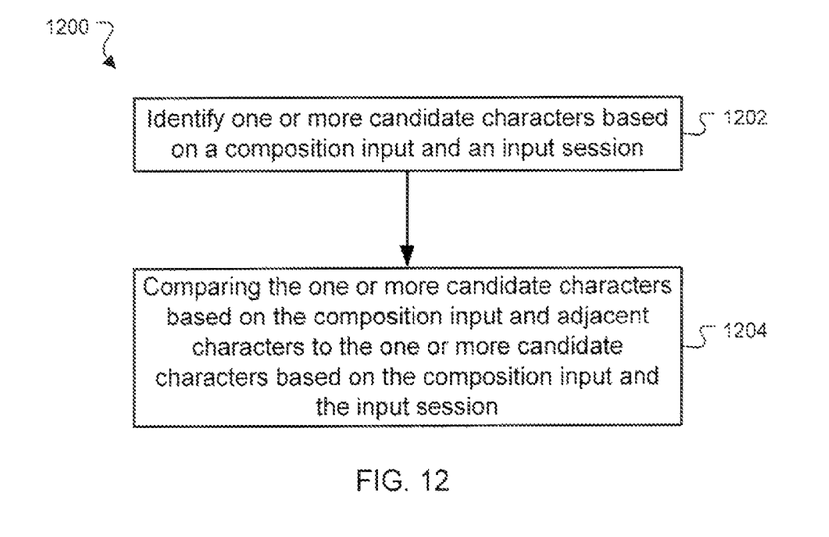
FIG. 12 is a flow diagram of an example process for using an input session with a context based input engine.

FIG. 12 is a flow diagram of an example process 1200 for using an input session with a context based input engine, such as the input engine 204. The process 1200 can, for example, be implemented in a system such as the system 100 of FIG. 1 and/or the system 200 of FIG. 2.

Stage 1202 identifies one or more candidate characters based on a composition input and an input session. For example, the input engine 204 can identify one or more candidate characters based on a composition input and an input session.

Stage 1204 compares one or more candidate characters based on the composition input and adjacent characters to the one or more candidate characters based on the composition input and the input session. For example, the input engine 204 can compare the candidate characters identified for an input session to the candidate characters identified for the composition input and adjacent characters. The sets of candidate characters, e.g., candidate characters 814 and 816 of FIG. 8, can be compared to identify a subset of candidate characters for presentation to a user.

Figure 13:
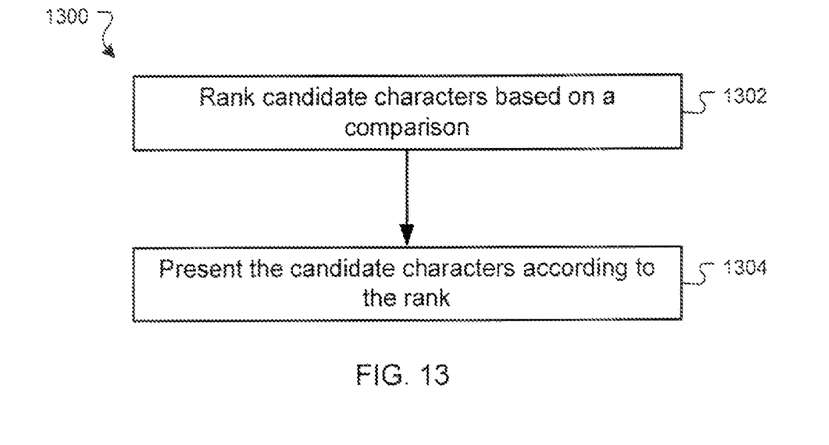
FIG. 13 is a flow diagram of an example process for determining an order to present candidate characters.

FIG. 13 is a flow diagram of an example process 1300 for determining an order to present candidate characters. The process 1300 can, for example, be implemented in a system such as the system 100 of FIG. 1 and/or the system 200 of FIG. 2.

Stage 1302 ranks candidate characters based on a comparison. For example, the input engine 204 can rank the candidate characters by comparing an assigned score (e.g., a relevance score or an accuracy score) of the candidate characters.

Stage 1304 presents the candidate characters according to the rank. For example, the input engine 204 can present the candidate characters in the editing device 202 in an order based on the rank.

Although various implementations have been described, other implementations can also be used. For example, the input engine 204 can be capable of mapping composition inputs from a western keyboard to input Chinese, Japanese, Korean and/or Indic characters. In some examples, some or all implementations described can be applicable to other input methods, such as Cangjie input method, Jiufang input method, or other input methods In some examples, the context window can be defined vertically when the editing device 202 is selected to display text vertically. For example, the input engine 204 can detect a direction of the logographic script. Based on the detected direction, the input engine 204 can define a vertical or horizontal context window aligned (e.g., centered) at a selected character. If a vertical context window is defined, the input engine 204 can identify characters above and below the selected character as adjacent characters.

In some implementations, the system 200 can receive input from a handwriting recognition device to insert a character at a selected location. For example, the received input may be a composition of stroke order assembled in a way in which a desired character is written. In some implementations, the input engine 204 can identify characters adjacent the selected location. Based on the received stroke order and the adjacent characters, the input engine 204 can identify candidate characters to be inserted at the selected location.

The apparatus, methods, flow diagrams, and structure block diagrams described in this patent document may be implemented in computer process systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
selecting a character from a plurality of characters of a logographic script, the plurality of characters displayed on an output device;
defining a context window having a context window size that corresponds to a number of characters;
aligning the context window with respect to the selected character such that the selected character is within the context window and characters proximate to the selected character and within the context window are first proximate characters;
receiving a composition input;
identifying candidate characters based on the composition input, the selected character and the proximate characters;
generating an adjusted context window by adjusting the size of the context window based on a number of the candidate characters exceeding one or more threshold numbers, the adjusted context window size corresponding to increasing or decreasing the total number of characters within the context window and wherein characters proximate to the selected character and within the adjusted context window are second proximate characters; and
identifying one or more new candidate characters based on the composition input, the selected character, and the second proximate characters.

2. The method of claim 1, comprising:
determining if a sentence break is within the context window; and
adjusting an edge of the context window to coincide with the sentence break if the sentence break is determined to be within the context window.

3. The method of claim 1, wherein adjusting the size of the context window size based on a number of the candidate characters exceeding one or more threshold numbers comprises increasing the context window size when the candidate characters exceed a first threshold number.

4. The method of claim 1, wherein adjusting the size of the context window based on a number of the candidate characters exceeding one or more threshold numbers comprises decreasing the context window when the candidate characters do not exceed a second threshold number.

5. The method of claim 1, comprising:
centering the context window on the selected character.

6. The method of claim 1, wherein adjusting the size of the context window based on a number of the candidate characters exceeding one or more threshold numbers comprises:
increasing the context window size when the number of candidate characters exceed a first threshold number; and
decreasing the context window when the number of candidate characters do not exceed a second threshold number;
wherein the second threshold number is less than the first threshold number.

7. The method of claim 1, comprising:
identifying one or more candidate characters based on the composition input and an input session; and
comparing the one or more candidate characters based on the composition input, the selected character and the proximate characters to the one or more candidate characters based on the composition input and an input session.

8. The method of claim 7, comprising:
determining common characters based on the comparison; and
presenting the common characters as candidate character selections.

9. The method of claim 7, comprising:
ranking the candidate characters based on the comparison; and
presenting the candidate characters according to the rank.

10. The method of claim 1, wherein:
the characters comprises Hanzi characters; and
the composition input comprises one or more Pinyin syllables.

11. A system, comprising:
a data store storing an association of composition inputs, context information, and characters, wherein one or more of the characters is associated with a plurality of composition inputs and the context information;
an input engine stored in computer readable medium and comprising instructions executable by a processing device that upon such execution cause the processing device to:
select a character from a plurality of characters in response to a user input;
define a context window having a context window size that corresponds to a number of characters;
align the context window with respect to the selected character such that the selected character is within the context window and characters proximate to the selected character and within the context window are first proximate characters;
receive a composition input;
identify candidate characters based on a composition input, the selected character and the first proximate characters;
generating an adjusted context window by adjusting the size of the context window based on a number of the candidate characters exceeding one or more threshold numbers, the adjusted context window size corresponding to increasing or decreasing the total number of characters within the context window and wherein characters proximate to the selected character and within the adjusted context window are second proximate characters; and
identifying one or more new candidate characters based on the composition input, the selected character, and the second proximate characters.

12. The system of claim 11, wherein:
the input engine comprises instructions executable by a processing device that upon such execution cause the processing device to:
determine if a sentence break is within the context window; and
adjust an edge of the context window to coincide with the sentence break if the sentence break is determined to be within the context window.

13. The system of claim 11, wherein:
the input engine comprises instructions executable by a processing device that upon such execution cause the processing device to:
increase the context window size when the number of candidate characters exceed a first threshold number; and
decrease the context window when the number of candidate characters do not exceed a second threshold number;
wherein the first threshold number is greater than the second threshold number.

14. The system of claim 11, wherein:
the input engine centers the context window on the selected character.

15. The system of claim 11, wherein:
the input engine comprises instructions executable by a processing device that upon such execution cause the processing device to:
identify one or more candidate characters based on the composition input and an input session; and
compare the one or more candidate characters based on the composition input, the selected character and the adjacent characters to the one or more candidate characters based on the composition input and an input session.

16. The system of claim 15, wherein:
the input engine comprises instructions executable by a processing device that upon such execution cause the processing device to:
determining common characters based on the comparison; and
present the common characters as candidate character selections.

17. The system of claim 15, wherein:
the input engine comprises instructions executable by a processing device that upon such execution cause the processing device to:
rank the candidate characters based on the comparison; and
present the candidate characters according to the rank.

18. The system of claim 11, wherein:
the characters comprises Hanzi characters; and
the composition input comprises one or more Pinyin syllables.

19. A system, comprising:
means for selecting a character from a plurality of characters of a logographic script;
means for defining a context window having a context window size that corresponds to a number of characters;
means for aligning the context window with respect to the selected character such that the selected character is within the context window and characters proximate to the selected character and within the context window are first proximate characters;
means for receiving a composition input;
means for identifying one or more candidate characters based on a composition input, the selected character and the proximate characters;
means for generating an adjusted context window by adjusting the size of the context window based on a number of the candidate characters exceeding one or more threshold numbers, the adjusted context window size corresponding to increasing or decreasing the total number of characters within the context window and wherein characters proximate to the selected character and within the adjusted context window are second proximate characters; and
means for identifying one or more new candidate characters based on the composition input, the selected character, and the second proximate characters.

* * * * *